United States Patent Office

3,840,520
Patented Oct. 8, 1974

3,840,520
CROSS-LINKING AGENT FOR CYANOETHYL ETHERS OF GALACTOMANNAN
Robert Nordgren and Curtis L. Karl, Minneapolis, Minn., assignors to General Mills Chemicals, Inc.
No Drawing. Filed May 19, 1972, Ser. No. 254,969
Int. Cl. C07g 3/00
U.S. Cl. 260—209 R  2 Claims

ABSTRACT OF THE DISCLOSURE

Tetraalkyl titanate as a cross-linking agent for cyanoethyl ethers of galactomannans. The tetraalkyl titanate will cross link the polymer to increase its thickening power or form gels in solvents containing not more than about 2% water.

---

This invention relates to cross-linking cyanoethyl ethers of galactomannan gums. More particularly, this invention relates to cross-linking cyanoethyl ethers of galactomannan gums with tetraalkyl titanate in selected organic liquids.

The term "galactomannan" as used herein includes the general class of polysaccharides containing both galactose and mannose units. They are usually found in the endosperm sections of leguminous seeds as guar, locust bean, tara, honey bean, flametree and cassia occidentalis. Cyanoethyl ethers of galactomannans are obtained by reacting acrylonitrile with galactomannan gum thus substituting cyanoethyl groups onto the galactomannan gum thus substituting cyanoethyl groups onto the galactomannan polymer chain. One method of preparing cyanoethyl ethers of galactomannan having a degree of substitution of up to 1.8 is disclosed in U.S. Pat. 2,461,502, the disclosure of which is hereby incorporated by reference. By degree of substitution as used herein is meant the substitution of ether groups per anhydro sugar unit. A method of making cyanoethyl ethers of galactomannans having degrees of substitution greater than 1.8 comprises heating water, acrylonitrile and the galactomannan gum at reflux under alkaline conditions and periodically diluted with water.

In detail the cyanoethyl ethers of galactomannans having degrees of substitution greater than 1.8 are made by the following procedure. Water, acrylonitrile and the galactomannan gum are added to a reactor along with an alkali metal hydroxide. The galactomannan is present in an amount of 100 to 300 parts, preferably 150 to 250 parts, per 1000 parts of reaction mixture. The water is present in a minimum amount of 100 parts by weight per 200 parts of gum. The acrylonitrile is present in an amount of 2 to 5 parts, preferably 2.5 to 3.5 parts by weight per part of gum. Therefore, the process uses acrylonitrile in an amount of 7.5 to 19 moles of acrylonitrile per mole of galactomannan gum and preferably about 11.3 moles of acrylonitrile per mole of gum wherein one mole of galactomannan is defined as 200 grams of galactomannan. The alkali metal hydroxide, preferably sodium hydroxide, is added with the water in a catalytic amount as an aqueous solution in a concentration of 0.75% to 1.25% to insure that the reaction is conducted under alkaline conditions. The reactants are stirred and heated to the reflux temperature and heating is continued until the mixture becomes very viscous, generally about 5 minutes of heating time. Sufficient water, preferably 0.25 to 1.0 parts per part of galactomannan, is added to the heated solution to partially precipitate the reaction mixture and the mixture is heated until the viscosity is substantially the same as prior to the water addition. The procedure is repeated until the water added produces no substantial change in the viscosity of the mixture upon continued heating.

The reaction mixture is then continuously heated for an additional period of time, preferably 15 minutes or greater, to insure completion of the reaction. Thereafter, the mixture is neutralized, preferably with acetic acid followed by the addition of water in an amount of 0.25 to 1.0 parts by weight of the acrylonitrile charged to the reactor. The mixture is heated and the excess acrylonitrile distilled off by gradually increasing the mixture temperature to the boiling point of water. The distillate which is obtained is comprised of two layers, the acrylonitrile-rich layer, i.e. up to 97% acrylonitrile, and the water layer, containing up to 7% acrylonitrile. The distillate removed can be used in the initial stages of the reaction. After distillation, the reactor is filled with water, stirred and allowed to settle. Two layers are formed during the settling, the upper layer (which is turbid and brown) is decanted from the solids and the reactor again filled with water and stirred followed by settling. The upper layer is lighter in color than that obtained during the first settling. The procedure of decantation and the addition of water is continued until the upper layer is almost clear and colorless. The solids remaining in the lower layer are then filtered, dried and ground. The resuling product is a cyanoethyl ether of the galactomannan gum having a degree of substitution of greater than 1.8. Other methods of recovering the cyanoethyl ether of the galactomannan gum include centrifugation, filtration, etc. The optimum degree of substitution is determined by the particular solvent to be thickened or gelled.

Cyanoethyl ethers of galactomannans are dispersible and solvate in a number of organic liquids. These organic liquids can be thickened with cyanoethyl ethers of galactomannans. Among these organic liquids are formamide, propylene carbonate, acetic anhydride, nitroparaffins, N,N-dimethyl formamide and acetonitrile. Nitroparaffins which are solvents for cyanoethyl ethers of galactomannans contain one to three carbon atoms and include nitromethane, nitroethane, 1-nitropropane, 2-nitropropane and 2,2-nitropropane. Thickened nitroparaffins are especially useful in the explosive field. Generally, explosives are comprised of an inorganic oxidizer such as a nitrate, e.g., alkali metal nitrate or alkaline earth nitrates, a liquid such as a nitroparaffin, a thickening agent and a sensitizing explosive such as trinitrotoluene. The nitroparaffins are generally solutions and must be thickened prior to use. Various thickeners for explosive compositions have been tried previously. However, they are usually subject to certain disadvantages. For instance, nitrocellulose is used to thicken nitromethane, but nitrocellulose is very flammable and explosive. When nitrocellulose is used with nitromethane, high risk is involved because of the explosive properties of the mixture. Another advantage that cyanoethyl ethers of galactomannan gums enjoy over nitrocellulose is thickening efficiency. In general, it requires up to two times more nitrocellulose to obtain the same amount of thickening than is developed by the use of cyanoethyl ether of galactomannan gums. Likewise, the nitrostarch compounds possess many of the same disadvantages as nitrocellulose. These disadvantages can now be overcome by the use of a cyanoethyl ether of a galactomannan gum as a thickener for the nitroparaffins. The cyanoethyl ethers of lactomannan gums are not explosive and are not any more volatile than flour when mixed with nitroparaffins. In the instance of nitroparaffins, the optimum degree of substitution of the cyanoethyl ethers of galactomannans is about 1.0 to 2.7 and most preferably from about 1.8 to 2.7.

It has now been found that cyanoethyl ethers of galactomannans dispersed in organic solvents will cross link in the presence of the tetraalkyl titanate under substantially anhydrous conditions. The tetraalkyl titanates useful in the practice of the present invention are those in which the alkyl radicals contain 3 to 4 carbon atoms. Particularly preferred are tetraisopropyl titanate and mixtures of the tetranormal, tetrasecondary and tetratertiarybutyl titanate. By substantially anhydrous conditions is meant systems containing less than about 2% water by weight of the solvent. Cross linking of the cyanoethyl ethers of galactomannans causes the cyanoethyl ethers of galactomannans to form larger molecules which increase the viscosity of the dispersions without increasing the amount of cyanoethyl ethers of galactomannans in the dispersion. The amount of thickening occurring in sols containing no cross-linked cyanoethyl ether of a galactomannan is influenced by the amount of the cyanoethyl ether of the galactomannan in the sol. Apparent gels may be formed or heavy thickening obtained by using large amounts of cyanoethyl ethers of galactomannans. The same effects, however, can be obtained by employing lesser amounts of cyanoethyl ethers of galactomannans and cross linking the molecules. When there is a relatively high concentration of a cyanoethyl ether of galactomannan in the dispersion, a low degree of cross linking can produce gelation. When there is a relatively low concentration of a cyanoethyl ether of a galactomannan in the dispersion, a relatively high degree of cross linking can produce gelation. As can be readily appreciated, the thickening power of the cyanoethyl ethers of galactomannans is increased by cross linking.

In commercial applications, cyanoethyl ethers of galactomannans are employed as thickeners over a wide concentration range depending upon the desired results and the organic liquid involved. In accoradnce with the present invention, the tetraalkyl titanate cross-linking agent is used at least in an amount sufficient to increase the thickening properties of the cyanoethyl ethers of galactomannans. To obtain substantial increases in thickening in dispersions containing a cyanoethyl ether of a galactomannan in amounts of from about 0.25% to 3% by weight of the solvent, the tetraalkyl titanate is preferably used at levels of about 0.1% to 0.25% by weight based on the weight of the gum. To obtain cross linking sufficient to form a gel in such dispersions, the tetraalkyl titanate is preferably used in amounts of from about 0.25% to 5.0% by weight of the cyanoethyl ether of the galactomannan.

The tetraalkyl titanate may or may not be soluble in the non-aqueous medium in which the cyanoethyl ethers of a galactomannan is capable of dissolving or dispersing to form a sol. It is preferred in all instances because of the small amounts of the cross-linking agent used to dissolve the crosslinking agent in a solvent such as isopropanol or trichloroethylene before adding to the sol.

The cross-linking of cyanoethyl ethers of galactomannans is particularly important in the gelled explosive slurry field where nitroparaffins are used as fuels. By incorporating a tetraalkyl titanate into the formulation, the cyanoethyl ether will cross link thus forming a gelled explosive slurry. Formamide can also be used as a fuel in explosive slurries. It has further uses as an ionizing solvent for water. By the practice of this invention, formamide can be immobilized into a gel or may be thickened. As described below, cyanoethyl ether of galactomannan gels allows slow migration of formamide into water. Propylene carbonate is used in natural gas purification. It, too, can be immobilized into a gel or thickened. As described below, it, too, can be slowly added to water from a cyanoethyl ether of galactomannan gel. Acetic anhydride is used as a dehydrating and acetylating agent in the production of pharmaceuticals, dyes, perfumes and explosives. Again by the practice of this invention, the solvent can be used in thickened or gel form or slowly added to water from a gel. Dimethyl formamide is used in cleaning carbonaceous or greasy deposits. Thickening or gelling cleaning solvents prevents dripping during contact with dirty surfaces. It, too, can be allowed to migrate into water from a gel. Acetonitrile is, among other uses, a specialized solvent. When used as a solvent for materials to be applied as coatings, thickening or gelling reduces dripping. It also can be allowed to migrate into water from a gel. All of the above solvents can be used in explosive slurries.

The gels produced by the practice of this invention provide a means of retarding the dispersion of the non-aqueous solvent into water when a gel of the above-described solvents is immersed therein. When cross-linked non-aqueous gels of the type described above were immersed in water, a white skin quickly formed at the surface of the gel. When the non-aqueous solvent was soluble in water, the migration of the non-aqueous solvent from the gel into the water was greatly retarded by the gel and its surface skin.

EXAMPLE I

This example illustrates the cross-linking effect of tetraisopropyl titanate upon cyanoethyl guar dispersed in selected solvents.

The cross-linking effect of tetraisopropyl titanate was evaluated by a method having the following steps:

1. A stock solution of tetraisopropyl titanate was prepared containing 1.0 gram tetraisopropyl titanate per 100 cc. of isopropyl alcohol.

2. Samples of cyanoethyl guar thickened solvents were made as follows: Three and a half grams of cyanoethyl guar having a degree of substitution of 2.0+0.1 were added to 436 grams of solvent and the mixture stirred vigorously for ten minutes. The mixture was allowed to stand for 24 hours. The viscosity of the solvents was then measured with a Brookfield Viscometer using a #2 spindle rotating at 20 r.pm..

3. Fifty gram samples of the cyanoethyl guar thickened solvents were placed in four-ounce jars. The tetraisopropyl titanate in amounts of 0.5 to 2.0 ml. was pipetted into the samples. The samples were then shaken.

4. Step 3 was repeated until a gel formed.

The results of the above procedure are shown in Table 1.

TABLE 1.—GEL FORMATION

| Solvent | Viscosity of thickened solvent without crosslinking, cps. | Amount of tetraisopropyl titanate added, percent by weight cyanoethyl ether of guar | Type of gel formed |
| --- | --- | --- | --- |
| Acetic anhydride | 868 | 2.0 | Soft. |
| Acetonitrile | 430 | 1.0 | Stiff. |
| Dimethyl formamide | 474 | 2.0 | Do. |
| Formamide | 2,600 | 2.0 | Do. |
| Nitroethane | 684 | 1.0 | Do. |
| Nitromethane | 2,100 | 1.0 | Do. |
| Propylene carbonate | 2,425 | 3.0 | Soft. |

EXAMPLE II

This example illustrates the cross-linking effect of tetraisopropyl titanate and tetrabutyl titanate upon cyanoethyl guar dispersed in nitromethane.

Tetraisopropyl titanate and tetrabutyl titanate were dissolved in trichloroethylene to make solutions containing 2½% of the respective cross-linking agent by weight. The tetrabutyl titanate was a mixture of tetranormal, tetrasecondary, tetratertiarybutyl titanate sold by DuPont de Nemours under the tradename "Tyzor"®. The respective cross-linking agents were then added to 50 gram sample solutions of nitromethane containing 2% cyanoethyl guar by weight, in the amounts shown in Table 2. After mixing the solutions and the cross-linking agent for less than one minute, gels formed. The experimental observations are shown in Table 2.

TABLE 2.—GEL FORMATION

| Cross-linking agent | Percent by weight cross-linking agent based on cyanoethyl guar | Gel produced |
|---|---|---|
| Tetraisopropyl titanate | 5.00 | Stiff gel. |
| Do | 2.50 | Do. |
| Do | 1.25 | Do. |
| Do | 1.00 | Firm gel. |
| Do | 0.5 | Soft gel. |
| Do | 0.25 | Very soft gel. |
| Tetrabutyl titanate | 1.25 | Do. |
| Do | 1.00 | Do. |
| Do | 0.50 | Do. |

The embodiments of the invention in which an exclusive property or privilege is claimed are defined as follows:

1. In a composition comprising a cyanoethyl ether of a galactomannan dispersed in and solvated by an organic liquid containing less than about 2% water by weight, the improvement consisting of including as a cross-linking agent in said composition a tetraalkyl titanate wherein said alkyl radicals contain three to four carbon atoms.

2. The composition of claim 1 wherein the tetraalkyl titanate is present in amounts whereby the total composition is in a gel form.

References Cited

UNITED STATES PATENTS

| | | | |
|---|---|---|---|
| 3,074,927 | 1/1963 | Saltman et al. | 260—209 R |
| 3,536,510 | 10/1970 | Allen et al. | 260—209 R |
| 3,563,978 | 2/1971 | Ochs | 260—209 R |

JOHNNIE R. BROWN, Primary Examiner

U.S. Cl. X.R.

252—316

PO-1050
(5/69)

UNITED STATES PATENT OFFICE
CERTIFICATE OF CORRECTION

Patent No.   # 3,840,520      Dated October 8, 1974

Inventor(s)    Robert Nordgren and Curtis L. Karl

It is certified that error appears in the above-identified patent and that said Letters Patent are hereby corrected as shown below:

Column 1, line 26, after "seeds" insert -- such --

Column 1, line 30, after "galactomannan" delete -- gum thus --

Column 1, line 31, delete entire line

Column 2, line 23, "resuling" should be -- resulting --

Column 2, line 62, "lactomannan" should be -- galactomannan --

Column 3, line 25, after "thickening power" insert -- and gelling power --

Column 3, line 31, "accoradnce" should be -- accordance --

Column 4, line 29, "436" should be -- 346 --

Column 4, line 28, "2.0 + 0.1" should be -- $2.0 \pm 0.1$ --

Signed and sealed this 24th day of December 1974.

(SEAL)
Attest:

McCOY M. GIBSON JR.            C. MARSHALL DANN
Attesting Officer             Commissioner of Patents